United States Patent
Peng et al.

(10) Patent No.: US 11,506,422 B2
(45) Date of Patent: Nov. 22, 2022

(54) LOCATION BASED TEMPERATURE LIMIT CONTROL FOR A WATER HEATER

(71) Applicant: Rheem Australia Pty Limited, Rydalmere (AU)

(72) Inventors: Yue-Xin Peng, Rydalmere (AU); Wilson Ng, Rydalmere (AU); Alan Ng, Rydalmere (AU); Samuel Zhang, Rydalmere (AU); Martin Agbayani, Rydalmere (AU); Yao Zhou, Rydalmere (AU)

(73) Assignee: Rheem Australia Pty Limited, Rydalmere (AU)

( * ) Notice: Subject to any disclaimer, the term of this patent is extended or adjusted under 35 U.S.C. 154(b) by 69 days.

(21) Appl. No.: 16/465,074

(22) PCT Filed: Oct. 23, 2017

(86) PCT No.: PCT/AU2017/051155
§ 371 (c)(1),
(2) Date: May 29, 2019

(87) PCT Pub. No.: WO2018/098521
PCT Pub. Date: Jun. 7, 2018

(65) Prior Publication Data
US 2019/0331363 A1   Oct. 31, 2019

(30) Foreign Application Priority Data

Nov. 29, 2016 (AU) ............................... 2016904907
May 18, 2017 (AU) ............................... 2017901887

(51) Int. Cl.
*F24H 9/20* (2006.01)
*F24D 19/10* (2006.01)
(Continued)

(52) U.S. Cl.
CPC ....... *F24H 9/2007* (2013.01); *F24D 19/1051* (2013.01); *F24H 7/00* (2013.01); *G05D 23/1905* (2013.01)

(58) Field of Classification Search
CPC ..................................................... F24H 9/2007
See application file for complete search history.

(56) References Cited

U.S. PATENT DOCUMENTS

| 4,568,821 A | 2/1986 | Boe |
| 2011/0046792 A1* | 2/2011 | Imes ..................... F24F 11/61 700/278 |

(Continued)

FOREIGN PATENT DOCUMENTS

| CN | 103019122 A | 4/2013 |
| CN | 103389719 A | 11/2013 |

(Continued)

OTHER PUBLICATIONS

JPH03295433—machine translation (Year: 1991).*

(Continued)

*Primary Examiner* — Nathaniel Herzfeld
(74) *Attorney, Agent, or Firm* — Eversheds Sutherland (US) LLP

(57) ABSTRACT

A method of controlling a temperature of water delivered by a water heating system, includes providing communication device which is adapted to receive a communication from at least one mobile device, the communication device being located so as to determine when the at least one mobile device is within a predefined zone in which is located a pre-selected water access point. In response to a determination that the at least one mobile device is within the predefined zone, enabling a user selecting a temperature setting of the where the water heating system. The selection (Continued)

is wirelessly communicated to a receiver which is in communication with the water heating system.

18 Claims, 6 Drawing Sheets

(51) Int. Cl.
*F24H 7/00* (2022.01)
*G05D 23/19* (2006.01)

(56) References Cited

U.S. PATENT DOCUMENTS

| | | | |
|---|---|---|---|
| 2012/0046801 A1 | 2/2012 | Mori et al. | |
| 2012/0172027 A1* | 7/2012 | Partheesh | H04M 1/72415 455/420 |
| 2012/0179547 A1 | 7/2012 | Besore et al. | |
| 2013/0166965 A1* | 6/2013 | Brochu | H04W 60/00 714/48 |
| 2014/0045482 A1 | 2/2014 | Bisson et al. | |
| 2014/0316586 A1* | 10/2014 | Boesveld | F24D 19/1066 700/278 |
| 2015/0323943 A1* | 11/2015 | Chan | G05D 23/1951 700/278 |

FOREIGN PATENT DOCUMENTS

| | | |
|---|---|---|
| CN | 103438583 A | 12/2013 |
| EP | 2444758 A2 | 4/2012 |
| GB | 2252846 | 8/1992 |
| JP | 05133603 A * | 5/1993 |
| JP | 10-294974 A | 11/1998 |
| JP | 2014-109394 A | 6/2014 |
| JP | 2015-061203 A | 3/2015 |
| JP | 2015-210057 A | 11/2015 |
| JP | 2016-050691 A | 4/2016 |
| WO | 2014/113505 A1 | 7/2014 |

OTHER PUBLICATIONS

Office Action issued for Chinese Patent Application No. 201780073788.0 dated Aug. 24, 2020.
International search report for PCT/AU2017/05115, dated Jan. 23, 2017.
Balboa Water Group World-Wide, "BWA App User Guide" [retrieved from internet Jan. 15, 2018] <URL: http://www.balboawatergroup.com/bwa> published 2013.
Written Opinion of PCT/AU2017/051155, dated Jan. 29, 2018.
Office Action for Japanese Patent Application No. 2019-548498 dated Apr. 14, 2021 and English Translation.

* cited by examiner

LOCATION BASED TEMPERATURE LIMIT CONTROL FOR A WATER HEATER

RELATED APPLICATIONS

The present application is a national phase application of and claims priority to PCT Patent Application No. PCT/AU2017/051155, filed Oct. 23, 2017, which claims priority to Australian Patent Application No. 2016904907 filed Nov. 29, 2016 and to Australian Patent Application No. 2017901887 filed May 18, 2017. The entire contents of the foregoing applications are hereby incorporated herein by reference.

FIELD OF THE INVENTION

The present invention relates to temperature control for water delivered by a water heater, particularly location-based temperature control.

BACKGROUND OF THE INVENTION

A typical control topology for a hot water heater includes multiple controllers each located in a different room, such as the bathroom or the kitchen. These controllers are usually hard wired to the water heater, and communicate via a wired command protocol to provide pre-set water temperatures or request other special functions, such as bath filling. Because each controller is affixed to its respective room in the dwelling or building, the controllers can be uniquely identified, and different temperature limits can be set based on the location of the controller. For example, the controller in the kitchen will enable a higher maximum water temperature, say 60 degrees Celsius (° C.) for rinsing dishes, whereas the controller in the bathroom will only enable a lower maximum water temperature (say 50° C.) to avoid or reduce the likelihood of scalding.

Adoption of wireless mobile devices, such as a remote unit, a smart phone or a tablet, in place of the traditional wired controllers can create unsafe conditions. For example, it is possible for a user to authorise a higher temperature setting in a bathroom, from the same device that also is used to authorise the higher temperature setting (say 60° C.) for rinsing dishes in the kitchen.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides a method of controlling a temperature of water delivered by a water heating system, including:
providing a communication device located so as to determine when at least one mobile device is near a pre-selected water access point;
in response to a determination that the at least one mobile device is near the pre-selected water access point, enabling a user to select a temperature setting of the water heating system;
in the event a selection is made, wirelessly communicating the selection to a receiver which is in communication with the water heating system.

The selected temperature setting can include selecting a higher temperature setting where said water heating system outputs water above a lower temperature range.

In the absence of the selection being made, the water heating system can output water at a temperature within the lower temperature range.

The communication device can be an emitting device which emits a signal that is adapted to be detected by the at least one mobile device.

The determination of the mobile device being located near the pre-selected water access point can be made by the mobile device detecting the emitted signal.

The range of the emitted signal from the emitting device can be adjustable, to provide appropriate coverage of the area served by the pre-selected water access point.

The emitted signal can be: Bluetooth signal, Bluetooth Low Energy (LE) signal, an infra-red beam, a predetermined sound frequency pattern, or an ultra-sound signal.

The method can further include, upon a determination that the mobile device is located near the pre-selected water access point, removing a restriction to the selection of temperature setting on the mobile device.

In the selected temperature setting, the water heater can heat water to a pre-set temperature. The temperature can be pre-set by the user.

A range of water temperatures above the lower temperature range can be selectable within the higher temperature setting.

The step of selecting the higher temperature setting includes the user making, choosing, or confirming said selection.

The method can include the step of authenticating a user and/or authenticating the mobile device.

The step of user and/or mobile device authentication can occur before or after the selection of the temperature setting.

The temperature setting can be selected by the user and/or the automatically selected by mobile device being authenticated.

The user authentication can comprise password or passcode verification, biometric verification, or a combination thereof.

The mobile device authentication can comprise one or more of the following: scanning a barcode or Quick Response (QR) code, near field communication (NFC) scanning, resting or cradling the mobile device a pre-set location or connection point.

The user and/or mobile device authentication can be performed at an authentication device located near the pre-selected water access point.

A user can select the temperature setting by making a selection on the mobile device, triggering a switch, scanning a barcode or Quick Response (QR) code, near field communication (NFC) scanning, or resting or cradling the wireless device in a pre-set location or connection point.

The method can include recording an internet protocol (IP) address of the mobile device upon the determination of the mobile device being near the pre-selected water outlet, and verifying that any subsequent communication originates from the same IP address.

Two or more mobile devices and the receiver can be paired, whereby each of the two or more mobile devices can enable a user to select the higher temperature setting.

An application program resided in the receiver can assign priority to each of the paired mobile device, and determine which mobile device has the priority to set the water temperature.

The selection of the higher temperature setting can initiate a session during which the water heating system delivers water at a selected temperature, and at the end of the session, the water heating system reverts to delivering water at the lower temperature.

An expiration of the selected temperature setting can be pre-set: by the user based on duration of use, triggered by user-deactivation, triggered by a loss of detection of said signal by said mobile device, or a combination of one or more thereof.

The pre-selected water outlet can be turned on to deliver water at the selected temperature, starting a timer once the pre-selected water outlet is turned off and finishing the session after the timer reaches a predetermined time period.

The selected higher temperature setting can still apply when the pre-selected water outlet is again turned on during the predetermined time period.

The mobile device can communicate with the receiver using one of the following: ultra high frequency (UHF) radio signals, very high frequency (VHF) radio signals, frequency modulated (FM) radio signals, amplitude modulated (AM) radio signals, 3G, 4G, or 5G protocol, Bluetooth classic, Bluetooth lower energy (BLE), WIFI A/B/C/G/N, Infrared (IR).

The water heating system can be adapted to deliver heated water to two or more water outlets.

The emitting device can emit the signal over an adjustable range.

The emitted signal can include one or more than one of the following: Bluetooth signal, Bluetooth Low Energy (LE) signal, a infra-red beam, a predetermined sound frequency pattern, or an ultra-sound signal.

The method can further include the step of, upon a determination that the mobile device is located near the pre-selected water access point, removing a restriction to the higher temperature selection on the mobile device.

The present invention also provides a temperature control system for a water heating system, comprising
a signal emitter which is located near a pre-selected water outlet, and which emits a signal over a range, the signal being adapted to be detected or recognised by at least one mobile device adapted to determine whether it is near the pre-selected water outlet;
wherein an application executable on a processor of the mobile device or another device in communication with the mobile device is adapted to receive a determination that the mobile device is near the pre-selected water outlet, and in response to receiving the determination, allow a user to select a higher temperature setting or a lower temperature setting, the mobile device wirelessly communication the user selection to a receiver;
the receiver outputting a control signal to the water heating system to deliver water at a selected temperature in response to receiving a temperature setting selection.

The pre-selected water outlet can be permitted to deliver water at a temperature above a lower temperature or lower temperature range, and the application enables the user to select a lower temperature setting or a higher temperature setting.

The present invention also provides a software application product which when executed on a processor in a mobile device is operative to:
detect a signal emitted by a signal emitter when the mobile device is in range of the signal emitter to determine a location of the mobile device;
in response to determining the mobile device being located near a pre-selected water access point, allow a launch of a user interface which enables a user to select a temperature setting for water delivered by a water heater to the pre-selected water access point; and
wirelessly communicate the user selection to a receiver which is in communication with the water heater.

The said user interface can enable the user to select a higher temperature setting, wherein the water heater delivers water at a temperature higher than a lower temperature range.

The present invention further provides a water heater adapted to deliver heated water to one or more outlets, being controlled by a method of temperature control described above.

The present invention also provides a water heating system comprising a water heater mentioned above, having one or more outlets, to provide heated water to one or more faucets connected to the one or more outlets.

The water heater can have as many outlets as there are faucets to which heated water from the water heater is delivered.

The water heater can have two or more outlets, at least one of the two or more outlets delivering to at least one faucet where a maximum water temperature which is above a lower temperature range is allowed, the remaining outlet or outlets delivering to at least one faucet where the delivery temperature is within the lower temperature range.

The remaining outlet or outlets can be each fitted with a tempering valve

The or each outlet can be fitted with a tempering valve.

Faucet located tempering valves can be provided at all faucets except the at least one faucet where a maximum water temperature above the lower temperature is allowed.

Faucet located tempering valves can be provided at all faucets except at only one of the at least one faucet where a maximum water temperature above the lower temperature is allowed.

BRIEF DESCRIPTION OF THE DRAWINGS

An embodiment or embodiments of the present invention will now be described, by way of example only, with reference to the accompanying drawings, in which.

DETAILED DESCRIPTION OF THE EMBODIMENT OR EMBODIMENTS

The location based temperature control described herein can be applied to various water heater systems, such as a water heating and storage system, that is, one which includes a tank and heated by gas, electricity, heat pump, or solar power. Or it can be applied to an instantaneous water heating system, whether gas or electric, which does not include a storage tank. It is also envisioned that the control system can either be applied to the water heating system at the time of manufacture and installation, or be retrofitted to existing water heating system and plumbing network. For the following description, unless contrary is indicated, a gas instantaneous water heater is utilised in the embodiment, such as a CFGWH (continuous flow gas water heater).

At some water access points, such as faucets at a bathroom or powder room sink or the shower, safety precautions require that the water which is accessible by the user from the faucet is no hotter than a predefined or predetermined safe temperature threshold, e.g. 50 degrees Celsius, to prevent scalding. A water delivery temperature lower than or equal to the safe temperature threshold is within the lower temperature range. This predefined or predetermined temperature may be set as the default temperature to which the water heater will heat the water. The water heater may alternatively have its own default setting to deliver water at a certain temperature. At other locations, such as the laundry or the kitchen, a higher temperature setting is sometimes required for purposes such as washing and rinsing, which is usually above the safe temperature threshold.

Figure 1:
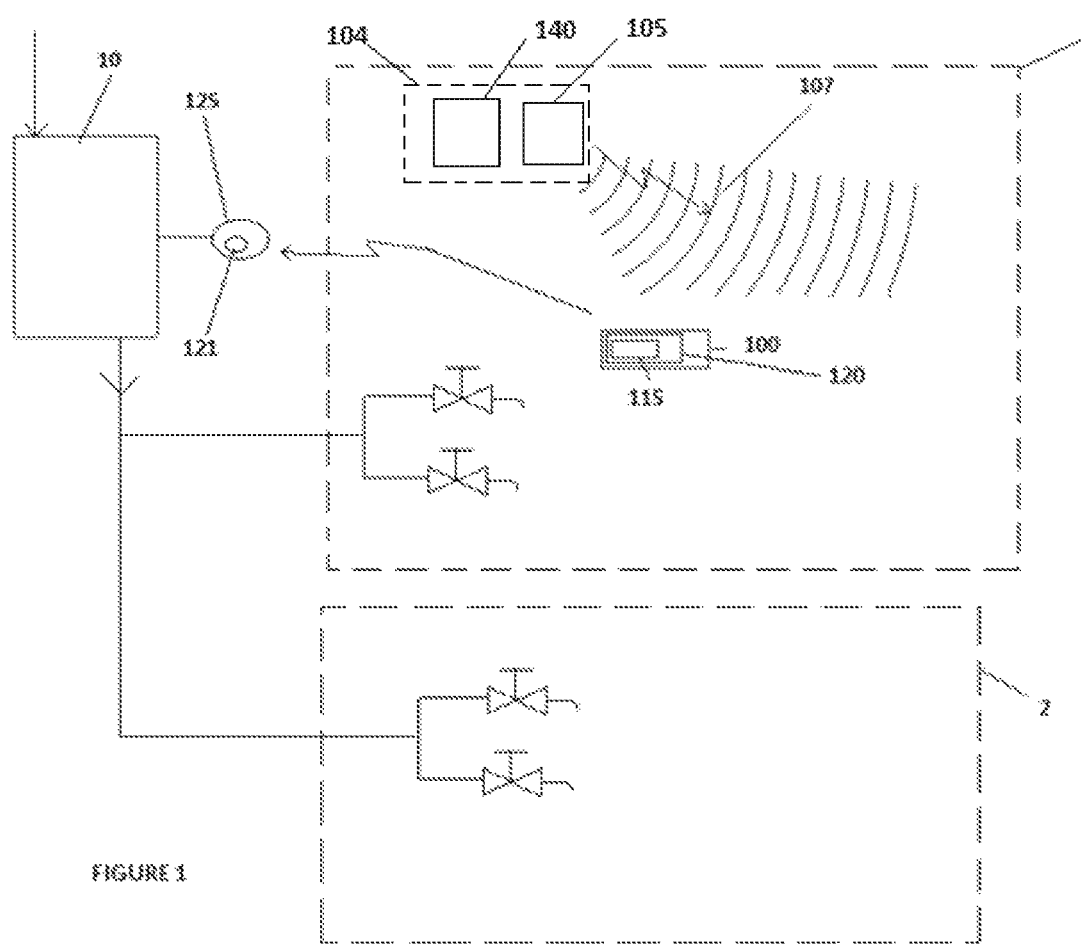
FIG. 1 is a schematic diagram showing a location based temperature control system in accordance with an aspect of the present invention.

FIG. 1 is a general depiction of the topology of a location based temperature control system 100 embodying the present invention. The location based temperature control system 100 allows a user to select or change a temperature setting of the water heater or water heating system, in one or more locations, when required. For instance, this selection may include setting a higher temperature than the lower temperature range discussed above. Outside of these locations, the water temperature setting is either pre-set to the pre-defined safe temperature threshold, or user-selectable within the lower temperature range.

The temperature control system 100 is provided for a water heater 10, which will service its own network of water access points, such as taps and faucets, in a dwelling or building. The water heater and its plumbing connections are considered a water heating system or water heating network. In some large dwellings where multiple water heaters are used, each water heating system will be subject to separate control by its own temperature control system 100.

The temperature control system 100 for a single water heating system allows one or more users to use his or her mobile device, such as a mobile phone, to adjust the temperature setting for the water. However, the user is only enabled to set a water temperature in the higher temperature range (i.e. above the safe temperature threshold), at certain locations such as water access points in the laundry or in the kitchen. That is, the temperature control system employs location based control.

The temperature control system 100 includes a communication device 104 that will be located to enable the confirmation of a presence of an authorised user near a water access point where the higher delivery temperature is allowed. The communication device 104 is adapted to receive a communication from the mobile device or authorised user, so as to confirm whether the user or mobile device is near the water access point. The communication device can include a signal emitting device 105 which emits a signal 107. The emitting device 105 is preferably a beacon. The beacon 105 is a directional emitting device, for example emitting one or more directional beams, such as laser or infrared beams. Alternatively the emitting device can emit an omnidirectional signal. The emitted signal can include Bluetooth, Bluetooth Lower Energy (BLE), radio, an infrared beam, a predetermined sound frequency pattern, or an ultra-sound signal, or any other signals that are suitable as location beacon signals. The signal emitting device 105 may comprise two or more beacons which transmit a wireless signal from a different source, allowing triangulation by the system. The requirement is that the emitting device 105 emits or transmits signals 107 that are detectable and identifiable by communication module 132 of the mobile device 110.

The emitting device or beacon 105 is provided at a location which is near a pre-selected water access point within the water heater network, e.g. a faucet at the kitchen sink, where a maximum water temperature which is higher than the lower safe temperature threshold is allowed. The signals produced by the beacon 105 will thus serve to demarcate the area of the higher temperature water access point, e.g. kitchen, from another part of the dwelling or space.

The beacon 105 produces a signal 107 that carries with it a signature that is detectable and identifiable, or adapted to be detected and identified, by at least one mobile device 110, such as a smart phone, tablet, or another wireless remote unit. As the beacon 105 is located near the pre-selected water access point, by the signal being detected and identified by the mobile device 110, the temperature control system 100 can determine when the mobile device 110 is near the pre-selected water access point. The area 1 where the beacon signal 107 is detectable by the mobile device 110 is the "pre-defined" location, where it is possible to use the mobile device 110 to request or set the water temperature to a higher temperature range. In the remaining area 2 where the beacon signal 107 is not detectable, the higher temperature setting is not allowed, and any temperature control is only permitted to be within the lower temperature range. The distance or range of the emitted signal 107 can be adjustable, so as to provide appropriate or sufficient coverage of the area to be served by the higher temperature water access point. The beacon or emitting device 105 thus includes an application which allows the signal to be tuned or adjusted, or a physical selector or adjustor such as a dial or button(s) to allow the tuning or adjustment.

Alternatively or additionally to the signal emitting device 105, the communication device 104 will include an authentication device 140. The authentication device 140 can be separate from or combined with the signal emitting device 105, in embodiments where both are included. The authentication device 140 can include one or more of the following: a biometric scanner such as a fingerprint scanner, a scanner for a barcode or Quick Response (QR) code, a near field communication (NFC) scanner; a cradle or surface for resting or cradling the mobile device at a pre-set location or connection point.

The mobile device 110 is operationally supplied with an application or program 115 which is executable by the processor 120 of the mobile device 110. The application or program 115 can be pre-loaded into the mobile device 110 or it can be a downloadable software application product. When executed, the program or application 115 operates to enable the user to interface with the temperature control system 100.

In response to a determination that the user or his or her mobile device 110 is near the pre-selected higher temperature water access point, the application or program 115 will launch or start, or be permitted to launch or start, with temperatures from the higher temperature range being enabled. Otherwise the application, if it is permitted to start, does not enable the user to choose from the higher temperature range. The application or program 115 is adapted to provide or enable the launch of a user interface for the user to, if desired, authorise, choose, or select a higher temperature setting at the pre-selected water access point. Optionally, the application or program 115 will include or implement a restriction which will prevent the user from authorising, choosing, or selecting a temperature setting from the higher temperature range. The restriction can also prevent the application or program from being started or launched by the user. This restriction is removed when the mobile device is determined to be near the pre-selected higher temperature water access point. The user can then choose or select the desired temperature setting, for example, the higher temperature setting.

The application or program 115, and the aforementioned associated user interface, is launched on the mobile device by the action of the user—i.e. swiping to the application or program, and then tapping to start. Alternatively, the application or program 115 will automatically launch when the mobile device 110 is determined to be within the pre-defined area.

In the pre-defined area, the user is enabled to choose a temperature setting which can be the higher temperature setting, where the allowed maximum output temperature is higher than the safe temperature threshold. The temperature setting can alternatively be a lower temperature setting, where the delivery temperature is selected from a range of temperatures lower than or at a "safe" temperature. In some embodiments, the water heating system will default to a safe temperature setting where the delivery temperature is within a lower temperature range. Thus the selectable temperature setting may be limited to a particular setting such as a higher temperature setting, and the safe temperature setting will be employed in the absence of the selection of the higher temperature setting.

The data provided or inputted by the user, such as commands or authorisation keys, is wirelessly transmitted to a receiver 125. Thus the mobile device 110 has a communications unit to transmit data over a compatible communications protocol as the receiver. The communication between the mobile device 110 and the receiver 125 is preferably secure, for example it is encoded. The receiver 125 is in communication with the water heating system to control the temperature setting of the water heater 10. The receiver 125 is a separate component which is in a wired or wireless communication with the controller of the water heater 10, or alternatively it is a built in module or component within the water heater controller.

The temperature control system 100 will only cause the water heater 10 to output water at the higher temperature when a selection for the higher temperature setting is communicated to the receiver 125. The water heater 10 outputs water at the lower, safe temperature in the absence of any selection.

As described above, the mobile device 110 is paired with the receiver 125 for communication. However, two or more mobile devices 110 may be paired with the receiver 125. That is, each of the paired mobile device 110 may be used by the user to select the temperature setting, when that mobile device 110 is in the pre-defined zone or predefined area. Optionally, an application or program 121 resided in the receiver 125 will assign a priority to each of the paired mobile devices. When two or more paired mobile devices are within the pre-defined area 1, the application or program 121 will determine which mobile device has the priority to set the water temperature. Communication or selections from the mobile device 110 with the highest priority will take precedence.

The delivery temperature within a particular temperature setting is pre-set by the manufacturer, pre-set by the user, or is user-selectable within the application or program 115. Optionally, where a manufacturer pre-set temperature has been chosen, the application or program will further provide the user the ability to change the pre-set temperature using the application program 115. In embodiments where the delivery temperature is user selectable, the selection is made at a set-up stage, or when the application program 115 of the temperature control system is launched.

For example, in a preferred scenario, within the higher temperature setting, once the "higher temperature" is chosen, either by the manufacturer or the user, subsequent selection of the higher temperature water setting will automatically cause the maximum allowable temperature to be the chosen "higher" temperature, without the user needing to confirm or input a "higher" temperature setting. This arrangement reduces the number of inputs the user needs to provide before the higher temperature setting can be activated. Alternatively, as the application program is launched, within the higher temperature setting the user can choose between selecting a pre-set temperature and selecting or inputting a new temperature from a range of water temperatures above the lower temperature; alternatively the user may simply be asked or enabled by the application program to input or select a temperature above the lower temperature. If desired, a temperature above ambient but below the lower safe temperature, could be selected or inputted.

In particular embodiments, the step of selecting the temperature setting includes authenticating the user, or authenticating the mobile device, or both. The step of authenticating the user and/or the mobile device reduces the likelihood of a child using an adult's mobile device to authorise water hotter than a safe lower temperature to be delivered at the faucet.

In a particular embodiment, the user is limited to choosing whether to select a higher temperature setting or not. To reduce the number of inputs the user needs to provide, a successful authentication will automatically cause the higher temperature setting to be selected. Alternatively, the system is set up so that authentication of the user and/or the mobile device is a separate step which needs to be completed, either before or after the selection of the temperature setting, for the receiver 125 to send a command for a higher temperature output to the water heater 10. This set up can be default, or be a selectable setting to be chosen at a later time, e.g. at installation or by the user at another time.

Figure 2:
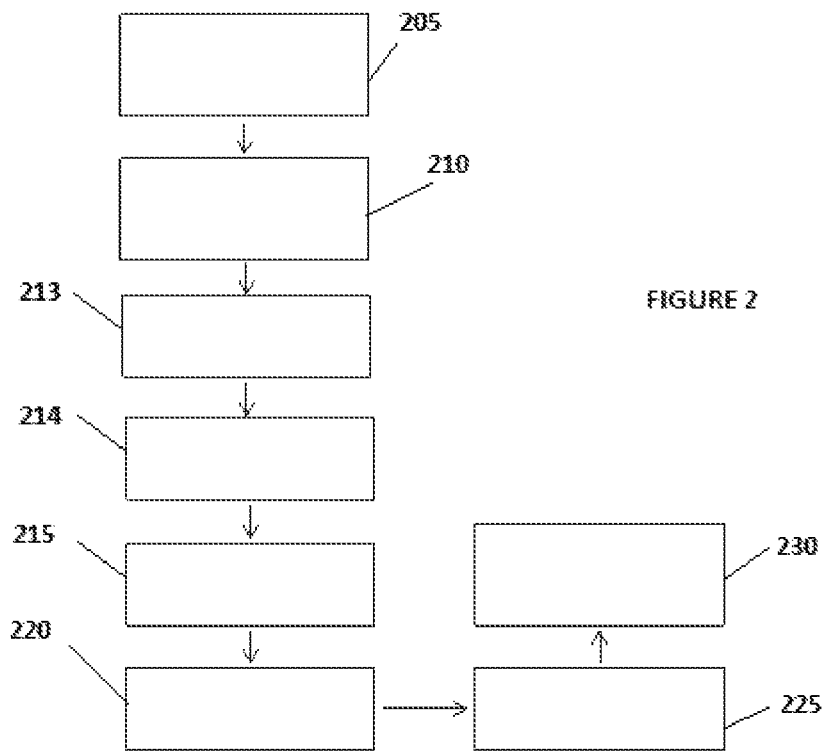
FIG. 2 is a flow chart depicting an event sequence of the temperature control system.

FIG. 2 depicts a flow chart of the process leading to a temperature setting being selected and communicated to the water heater. As shown in FIG. 2, when a mobile device is taken into an area (e.g. a room) that is covered by the signal range of the beacon 205, under normal operation the beacon signal will be detected and its signature identified by the mobile device 210. Upon the identification of the signal signature, an application program on the mobile device is launched 214. As mentioned before, the launch 214 is automatic or triggered by the user. Optionally, preceding the launch 214, the detection of the signal removes a restriction which prevents the launch of the application 213. After the application is launched, within the application program the user is enabled to select the temperature setting 215. As explained above, the action that causes the temperature setting to be selected can be the user selecting a temperature within that temperature setting and/or confirming that the particular temperature setting is to be chosen, and additionally or alternatively by the user completing the authentication step. Upon the selection of the temperature setting being completed, the application program will cause a signal communicating this selection to be wirelessly transmitted to the receiver 220. The receiver will in turn communicate this control data to the water heater 225. The water heater then outputs the water at a delivery temperature within the selected setting 230.

Figure 3:
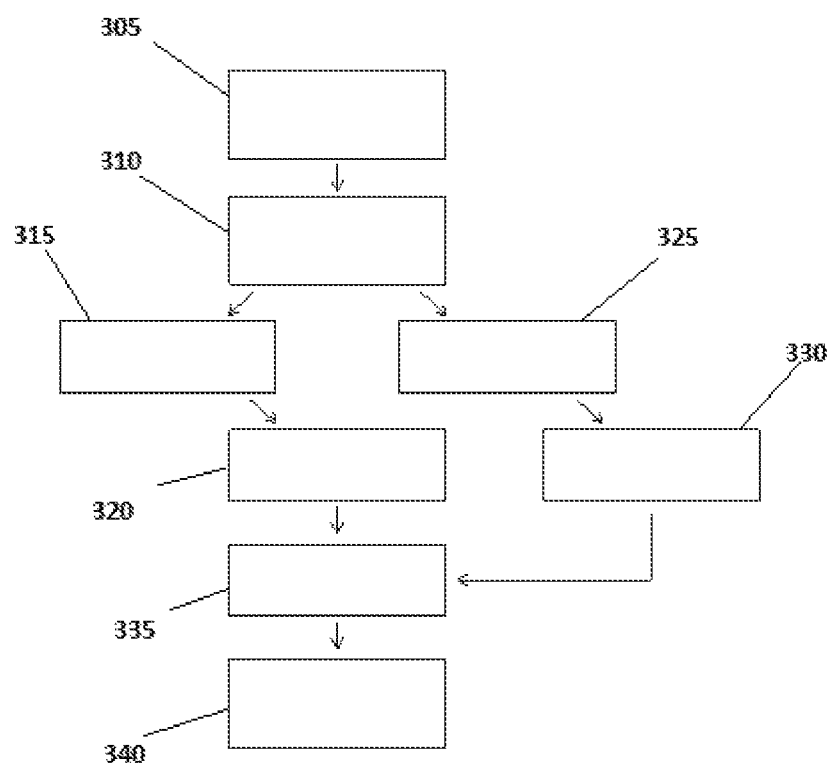
FIG. 3 is a flow chart depicting an alternative event sequence of the temperature control system.

FIG. 3 depicts a slightly different embodiment, where the user selection and user/mobile device authentication are provided directly to the receiver as separate data. To initiate the temperature control, a mobile device is taken into an area covered by the signal range of the beacon 305. Under normal operation and connectivity the beacon signal is detected and identified by the mobile device, and the application or program is launched 310 either automatically or by the user if he or she chooses to launch it. The application or program enables the user to confirm that a particular (e.g. higher) temperature setting is to be used 315, and causes a communication module of the device to wirelessly communicate this selection to the receiver 320. Alternatively, if pre-set by the manufacturer or by the user, the system will confirm that the user and/or the mobile device has been authenticated by requiring an authentication act or key 325, and then communicate the confirmation of authentication to the receiver 330. Once the receiver gets the signal that a particular temperature setting has been selected and that the user and/or mobile device has been authenticated, it provides a corresponding temperature setting command or control signal to the water heater controller 335. That is, for the water heater to output water at the selected temperature setting, the receiver needs to receive both the user selection for the temperature setting 315, and the confirmation that the user and/or the mobile device is authenticated 330. The water heater then outputs water at the appropriate delivery temperature 340.

Figure 4:
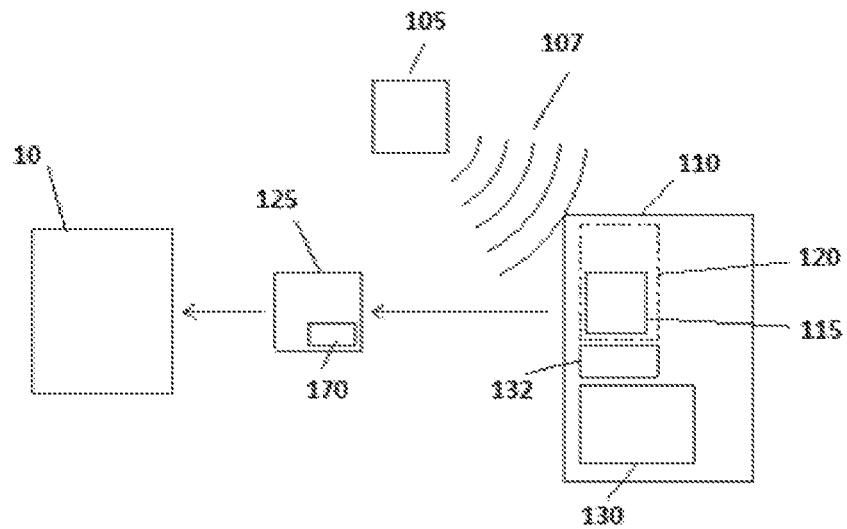
FIG. 4 is a schematic diagram depicting a water heating system having a temperature control system where the application resides on the mobile device.

The authentication of the user can be done either from the mobile device 110 or from a separate device provided at a convenient location in the region of the pre-selected water access point. FIG. 4 depicts a schematic depicting the communication and components of a first embodiment temperature control system 100 where the authentication is done on the mobile device 110. The mobile device 110 is equipped with an input module 130, which provides input to the processor 120. Using the input module 130, the user provides the appropriate authorisation key or authentication key, and this data is provided as an input to the processor 120. Once the application or program 115 receives the appropriate selection and/or authentication data, it provides a wireless signal to the receiver 125 to enable the water heater 10 to output water at the selected temperature setting.

The input module 130 will be one or more of the following: a keyboard/keypad such as an alpha-numeric keyboard/keypad, a biometric sensor such as a fingerprint sensor, a camera or scanner to scan, for example, a barcode, a Quick Response (QR) code provided at a location inaccessible by children, a retinal image, or a microphone to record a voice command. In some embodiments, a combination of different modes of verification will be required.

Figure 5:
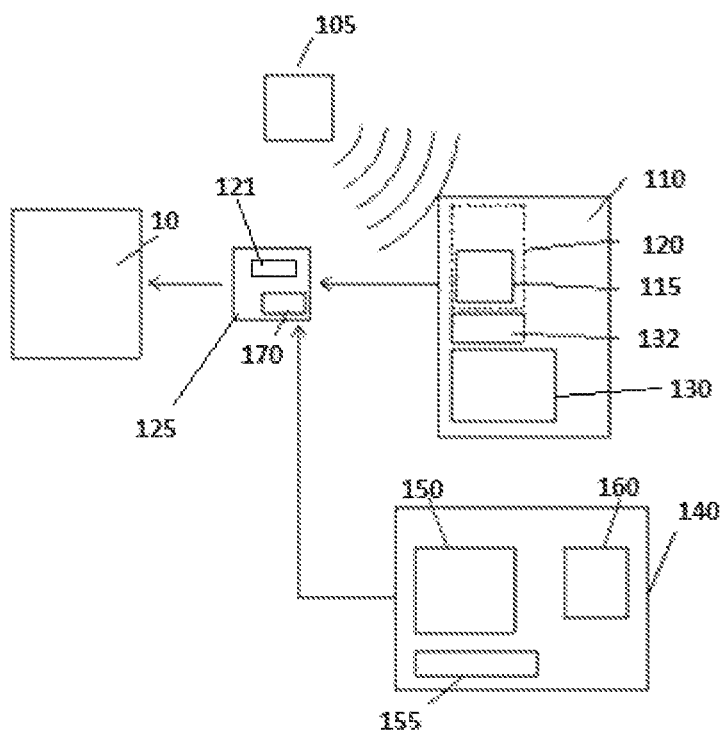
FIG. 5 is a schematic diagram depicting a water heating system having a temperature control system including a separately installed device.

In a variation shown in FIG. 5, the input module or hardware 150 used to input the authentication key is located on an authentication device 140, reducing the requirement or the user to enter data into the mobile device. This may be desirable as the user will possibly be handling wet or dirty items and may wish to minimise the number of steps needed to be performed on their mobile device. The separate authentication device 140 will either verify the authentication key provided, or provide the authentication key to the receiver 125 in a wired or wireless communication.

The authentication device 140 will include the input hardware or module 150. The input hardware or module 150 may include one or more of: a physical trigger or switch, a biometric scanner, a keypad enabling e.g. alphanumeric inputs, a cradle where the mobile device will rest, or a near field communication (NFC) scanner where the mobile device will be scanned, or a barcode or QR code scanner which will scan a barcode or QR code that will be presented on the mobile device screen by the application or program 115. The authentication device 140 will thus be provided at a pre-set location or connection point near the pre-selected water access point, preferably at a location out of view or unlikely to be accessed by small children. A communication module 155 included in the authentication device 140 enables the device 140 to communicate with the receiver 125 and the mobile device 110. The authentication device 140 will include a data storage medium 160, to store the authenticated key with which the data provided by the user will be compared, if it is the device which verifies the authentication key.

In some embodiments, the authentication device 140 will replace the signal emitting device 105. By the authentication device 140 being located near the water access point, the act of the user authenticating their mobile phones or other mobile devices on the authentication device 140 will confirm that the user is near the water access point.

In other embodiments, both the emitting device 105 and the authentication device 140 will be provided, either separately or in a combined device.

Figure 6:
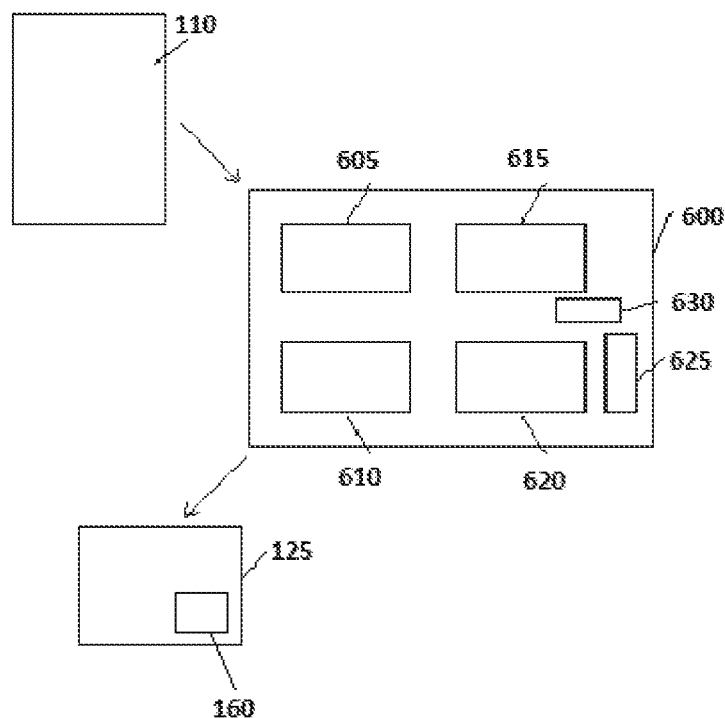
FIG. 6 depicts a schematic diagram of a separately installed device in communication with the mobile device.

In a further embodiment, a separately installed device, which can act as the aforementioned authentication device 140, is provided. The separately installed device will significantly reduce or eliminate the need for the user to handle their mobile device. For example, as shown in FIG. 6, a separately installed device 600 will include a communication module 605 which is adapted to communicate with the mobile device 110 using one or more of the available communication protocols. The mobile device 100, upon detection of the beacon signal, communicates the beacon detection to a controller or microcontroller 610 in the separately installed device 600. The user then enters the authentication key using the input module 620, which include one of more of the input modes mentioned above in relation to the aforementioned authentication device 140. The input data is compared with the verified key either stored in the data storage medium 625 within the device 600 or in the medium 170 within the receiver 125 to authenticate the user. Upon verification of the provided authentication key, the receiver will communicate with the water heater controller to output water at the higher temperature.

If the user does not require the higher temperature setting, the above authentication step is not performed. The water heater will heat water to the default temperature. The authentication device 140 or the separately installed device 600 will optionally include a timer 630 which provides a time window, from the time that the mobile device 110 verifies the detection of the beacon signal, in which the authentication key can be provided.

The controller 610 will optionally cause a display or an indicator 615 that indicates to the user that it is ready for the user to enter an authentication key using its input module 620. The display can be, for example, or one or more lights such as light emitting diodes, or a combination lights and other types of displays. Optionally, an indication light will switch on while the higher temperature setting is in operation, to serve as a visual warning to the user or other people within the dwelling. As another layer of authentication, when the mobile device 110 detects the beacon signal, it will optionally communicate its internet protocol (IP) address to be recorded in a data storage medium 170 in the receiver 125, or if available, a cooperating external device such as the authentication device 140. Before the receiver 125 accepts any subsequent data transmission or command, it will verify that the data or communication originates from the recorded IP address.

When a temperature setting is selected, the water heater controller will optionally initiate a finite session of time during which the water heater delivers water at the selected temperature to the pre-selected water access point. At the end of the session, the water heater reverts to delivering water at the default safe temperature, or the at the previous temperature setting. Additionally or alternatively, the expiry of the session can be triggered or arbitrarily determined by the user·i.e. by user deactivation, the user requesting the system to revert back to the previous or default temperature setting. This can be done by triggering a switch, or pressing or touching a key or button at the separately installed device, or by making a selection or request from the user interface from the application or program executable on the mobile device 110. Alternatively or additionally, the expiry of the session is determined by the end of the water use—i.e. when the user turns off the faucet at the pre-selected water access point, or can be time based whereby the session finishes after a predetermined time window. In some embodiments where the emitting device 105 is provided, the expiration can additionally or alternatively be triggered by a loss of detection of the beacon signal 107 by the mobile device.

Figure 7:
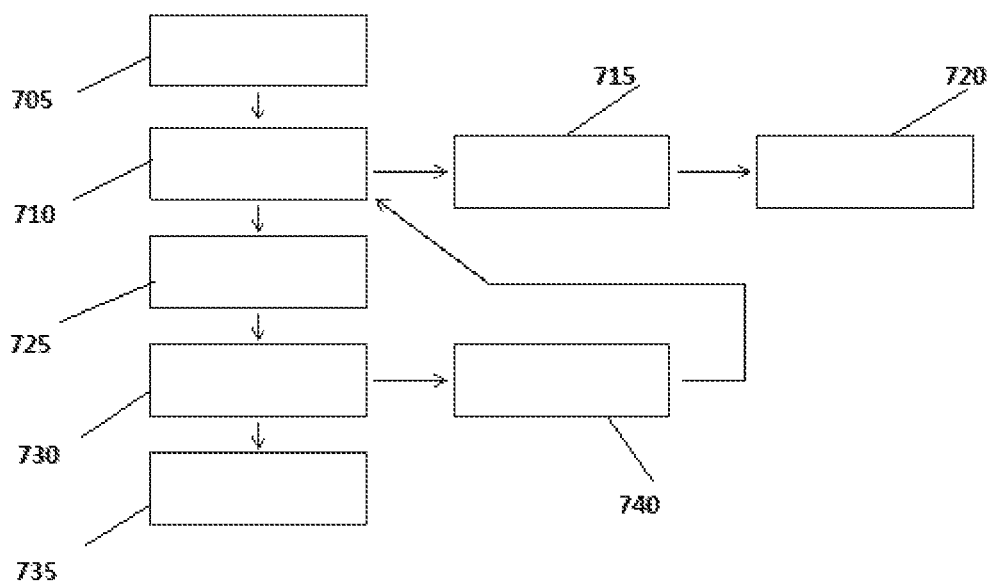
FIG. 7 is a flow chart showing a session initiation and end process for the higher temperature setting.

The session expiry can optionally be determined based on both usage and time. For example, as shown in FIG. 7, the selected temperature setting is initiated 705 when the temperature setting selection is received by the receiver and/or the water heater controller. The initiation starts a timer up to a first time period 710. If the user does not draw any water from the pre-selected water access point by the end of the first time period 715, then the session ends. If during the first time period the user turns on the faucet to draw water from the pre-selected water access point, the timer stops 725. The timer restarts when the user turns off the faucet, to measure time up to a second time period 730. The second time period may be the same or different than the first time period. If the faucet is not turned on again within the second time period, then the session ends 735. If the faucet is turned on again within the second time period 740, then the timer will restart up to the first time period again 710. The session continues this way until the user leaves the faucet off for a period longer than the second time period 730.

Before the end of temperature control session, the temperature control system or network will not permit another temperature control session to be initiated. This prevents the scenario where a user has chosen from the safe temperature setting at one location, but is unexpectedly scalded because a different user at a different location initiates a session where the water heater delivers water at a higher temperature.

Figure 8:
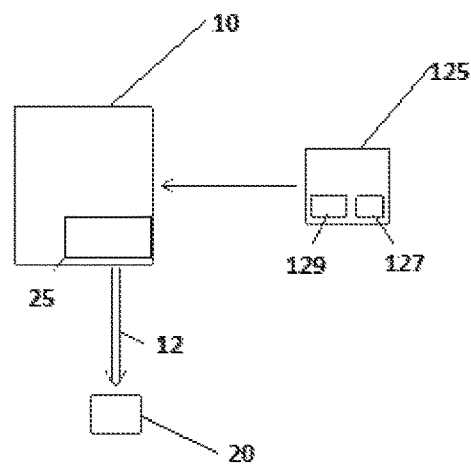
FIG. 8 is a schematic diagram showing a water heater and receiver components to enable the process shown in FIG. 7.

FIG. 8 depicts an example of the components that enable the process depicted in FIG. 7 to be implemented. A flow meter 25 embedded in the water heater 105 to measure the flow rate of water delivery from the water heater outlet 12 which delivers water to the pre-selected water access point 20. The output from the flow meter 12 is supplied to the receiver 125, which includes a timer 127. The timer supplies its data to a controller 129 such as a microcontroller, which implements the control routine described above.

In the above embodiments, communication between the mobile device 110, authentication device 140 or more generally a separately installed device 600, and the receiver 125, employs one of the following: ultra high frequency (UHF) radio signals, very high frequency (VHF) radio signals, frequency modulated (FM) radio signals, amplitude modulated (AM) radio signals, 3G, 4G, or 5G protocol, Bluetooth classic, Bluetooth lower energy (BLE), WIFI A/B/C/G/N, Infrared (IR).

Figure 9:
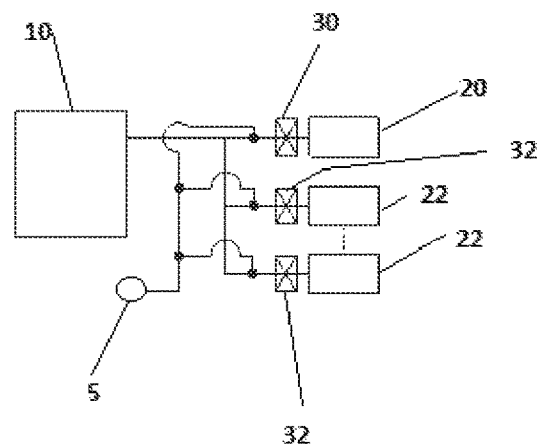
FIG. 9 depicts a water heating network where a water heater having one outlet provides water to two or more faucets.

FIG. 9 depicts a water heating network where the water heater has a single outlet but is adapted to deliver water to two or more faucets. The delivered heated water is mixed with the unheated water from the water mains 5 as required by the user at the faucets. At least one faucet 20 is located in the area where the higher temperature is permitted, e.g. in the kitchen. The other faucet(s) 22 are located in areas where the temperature setting selection or the higher temperature water is not permitted. However, while the higher temperature setting is active, water heated up to the higher temperature will be deliverable toward all faucets 20, 22. Therefore, in some embodiments, tempering valves 32 are installed at or near the faucets 22 to ensure the water temperature will be no higher than the safe temperature. The faucet 20 in the location where the higher temperature water is permitted can also be controlled by a tempering valve 30, but set to a higher temperature.

Figure 10:
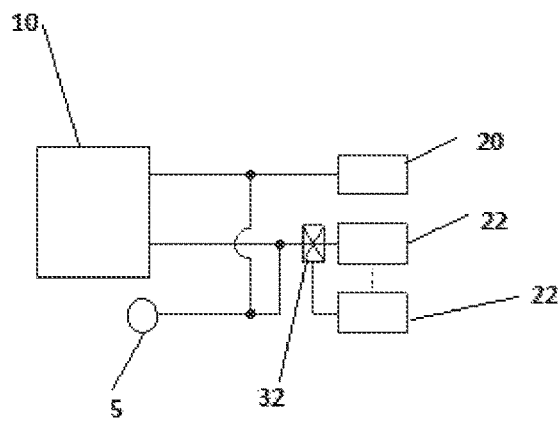
FIG. 10 depicts a water heating network where a water heater has at least two outlets, one delivering to faucets where water temperatures up to the higher temperature are permitted, another delivering to faucets where only water temperatures up to the lower temperature are permitted.

As shown in FIG. 10, alternatively, the water heater 10 will have at least two outlets, one delivering water to the faucet(s) 20 where water temperatures up to the higher temperature is permitted, another delivering water to one or more faucet 22 where only water temperatures up to the safe temperature are permitted. In the more extreme scenario, the water heater 10 can have as many outlets as there are faucets. Each faucet can be provided with a tempering valve 30, 32. However, tempering valves 32 are at least provided at the faucets 22 where temperatures up to only the safe temperature are permitted.

Figure 11:
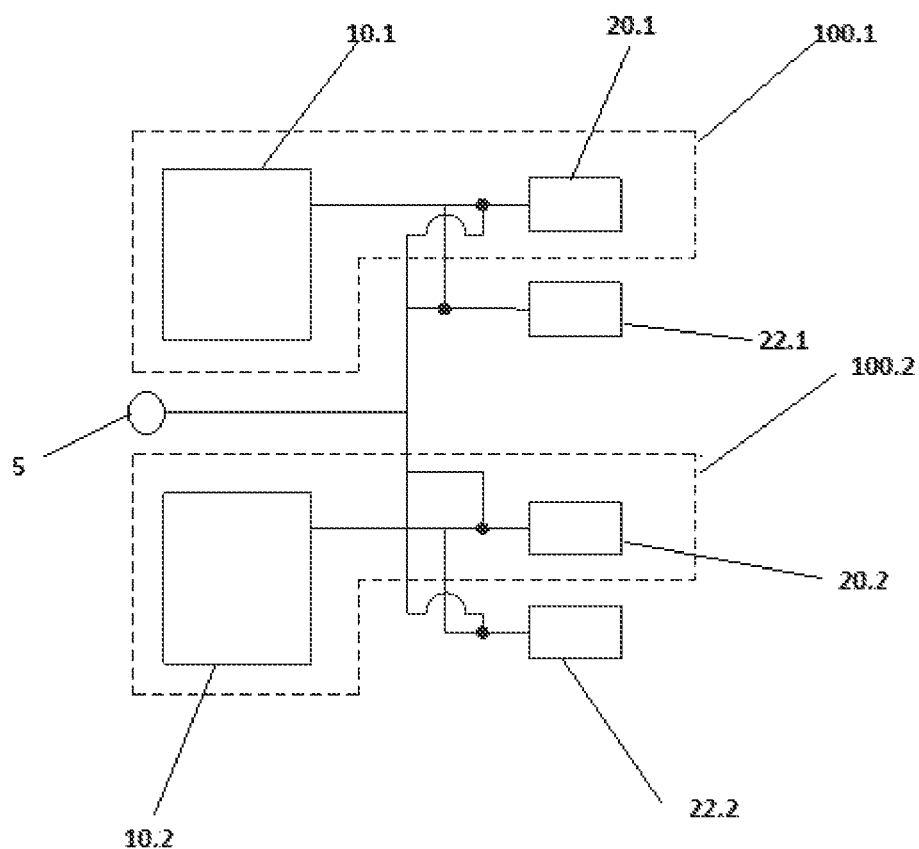
FIG. 11 depicts two water heating networks, each controlled by a separate temperature control system.

As shown in FIG. 11, in dwellings or buildings where there are, for example, two separate kitchens, the plumbing in each kitchen will preferably be part of a separate water heating network, each controlled by a separate temperature control system 100.

The beacons and receivers, and input and/or authentication devices can be provided in stand alone housings, such as the case with a retrofitted system, or if desired, provided as part of a general power outlet. If protection is to be sought, then housing of the general power outlet with beacon, receiver, input and authentication devices needs to be provided.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A method of controlling a temperature of water delivered by a water heating system, including:
   providing a communication device which is adapted to receive a communication from at least one mobile device, said communication device being located so as to determine when said at least one mobile device is within a predefined zone, the communication device comprising a beacon device;
   in response to receiving a message from the at least one mobile device indicative of the at least one mobile device having detected a beacon signal from the beacon device, determining that the at least one mobile device is within the predefined zone;
   in response to determining that the at least one mobile device is within the predefined zone, enabling a user to select a temperature setting of said water heating system, the temperature setting being greater than a predetermined safe temperature threshold; and
   in response to receiving a user selection, wirelessly communicating said selection to a receiver which is in communication with said water heating system.

2. The method as claimed in claim 1, wherein outside said predefined zone, the temperature setting is pre-set or is user-selectable within a lower temperature range which is below the predetermined safe temperature threshold.

3. The method as claimed in claim 2, wherein, in the absence of said selection being made, said water heating system outputs water at a temperature within said lower temperature range.

4. The method as claimed in claim 1, wherein the temperature setting comprises a range of water temperatures above said predetermined safe temperature threshold.

5. The method as claimed in claim 1, wherein said temperature setting is pre-set or selected by said user.

6. The method as claimed in claim 1, wherein said communication device is an emitting device which emits an emitted signal that is adapted to be detected by the at least one mobile device.

7. The method as claimed in claim 1, wherein said step of selecting said temperature setting includes authenticating a user and/or authenticating said mobile device.

8. The method as claimed in claim 7, wherein said temperature setting is automatically selected by said user and/or said mobile device being authenticated.

9. The method as claimed in claim 7, wherein said user authentication comprises password or passcode verification, biometric verification, or a combination thereof.

10. The method as claimed in claim 7, wherein said mobile device authentication comprises one or more of the following: scanning a barcode or Quick Response (QR) code, near field communication (NFC) scanning, or resting or cradling said mobile device at a pre-set location or connection point.

11. The method as claimed in claim 7, wherein said user and/or mobile device authentication is performed at an authentication device located within said predefined zone.

12. The method as claimed in claim 1, including recording an internet protocol (IP) address of said mobile device upon a determination of said mobile device being near a pre-selected water outlet, and verifying that any subsequent communication originates from the same IP address.

13. The method as claimed in claim 1, wherein said selection initiates a session during which said water heating system delivers water at a selected temperature, and at the end of said session, said water heating system reverts to delivering water at a previous or default temperature.

14. The method as claimed in claim 13, including the step of, after a pre-selected water outlet is turned on to deliver water at the selected temperature, starting a timer once the pre-selected water outlet is turned off and finishing the session after said timer reaches a predetermined time period.

15. The method as claimed in claim 1, wherein an expiration of said temperature setting is one or more than one of the following: pre-set by the user based on duration of use, triggered by user-deactivation, triggered by a loss of detection of said signal by said mobile device, or a combination of one or more thereof.

16. The method as claimed in claim 1, wherein said water heating system is adapted to deliver heated water to two or more water outlets.

17. The method as claimed in claim 6, wherein said emitted signal includes one or more than one of the following: Bluetooth signal, Bluetooth Low Energy (LE) signal, an infra-red beam, a predetermined sound frequency pattern, or an ultra-sound signal.

18. The method as claimed in claim 1, including the step of assigning a priority to said at least one mobile device, wherein when there are two or more mobile devices, said receiver receives communication from one of the two or more mobile devices with a higher priority.

* * * * *